(12) United States Patent
Zheng

(10) Patent No.: US 10,927,930 B2
(45) Date of Patent: Feb. 23, 2021

(54) RECIPROCATING LINEAR/ROTATIONAL MOTION CONVERSION DEVICE AND CYLINDER DEVICE

(71) Applicants: Anqing Zheng, Sichuan (CN); Chao Zhou, Sichuan (CN)

(72) Inventor: Anqing Zheng, Sichuan (CN)

(73) Assignees: Anqing Zheng, Sichuan (CN); Chao Zhou, Sichuan (CN)

( * ) Notice: Subject to any disclaimer, the term of this patent is extended or adjusted under 35 U.S.C. 154(b) by 0 days.

(21) Appl. No.: 16/614,364

(22) PCT Filed: May 8, 2018

(86) PCT No.: PCT/CN2018/086042
§ 371 (c)(1),
(2) Date: Nov. 17, 2019

(87) PCT Pub. No.: WO2018/210163
PCT Pub. Date: Nov. 22, 2018

(65) Prior Publication Data
US 2020/0191244 A1 Jun. 18, 2020

(30) Foreign Application Priority Data
May 18, 2017 (CN) .......................... 201710353223.X

(51) Int. Cl.
*F16H 19/04* (2006.01)
*F02B 75/24* (2006.01)
(Continued)

(52) U.S. Cl.
CPC ........... *F16H 19/043* (2013.01); *F01B 9/047* (2013.01); *F02B 75/24* (2013.01); *F01B 9/00* (2013.01); *F16H 2019/046* (2013.01)

(58) Field of Classification Search
CPC .. F16H 19/043; F16H 2019/046; F16H 19/02; F16H 19/025; F16H 19/04;
(Continued)

(56) References Cited

U.S. PATENT DOCUMENTS

| 4,907,548 | A | * | 3/1990 | Lee | ........................ F02B 75/243 123/197.3 |
| 4,915,019 | A | | 4/1990 | Hovaguimian | |
| 2004/0261750 | A1 | | 12/2004 | McKeown | |

FOREIGN PATENT DOCUMENTS

| CN | 1399063 A | 2/2003 |
| CN | 1462348 A | 12/2003 |

(Continued)

*Primary Examiner* — Jacob M Amick
(74) *Attorney, Agent, or Firm* — Novick, Kim & Lee, PLLC; Allen Xue

(57) ABSTRACT

A reciprocating linear/rotational motion conversion device has a main shaft, a linear motion guiding mechanism, a sector gear and a rack frame. The sector gear is fixedly connected with the main shaft. A rack pair is arranged on the inner wall of the rack frame. The rack pair comprises a first gear rack and a second gear rack separately arranged on both sides of the sector gear. The reciprocating linear/rotational motion conversion device further includes a reversing mechanism fixedly connected with the main shaft. A cylinder device contains the reciprocating linear/rotational motion conversion device, connecting rods, pistons and cylinder bodies. The cylinder body is sleeved on the piston, and a cylinder head is arranged on one end of the cylinder body.

9 Claims, 14 Drawing Sheets

(51) Int. Cl.
*F01B 9/04* (2006.01)
*F01B 9/00* (2006.01)
(58) Field of Classification Search
CPC .... F02B 75/24; F01B 9/00; F01B 9/02; F01B 9/023; F01B 9/047
See application file for complete search history.

(56) References Cited

FOREIGN PATENT DOCUMENTS

| | | | | | |
|---|---|---|---|---|---|
| CN | 105114179 | A | | 12/2015 | |
| CN | 105569843 | A | | 5/2016 | |
| CN | 206723380 | U | | 12/2017 | |
| GB | 468652 | A | * | 7/1937 | ........... F16H 19/043 |
| GB | 468652 | A | | 7/1937 | |

* cited by examiner

RECIPROCATING LINEAR/ROTATIONAL MOTION CONVERSION DEVICE AND CYLINDER DEVICE

FIELD OF THE INVENTION

The invention relates to a reciprocating linear/rotational motion conversion device and a cylinder device, in particular to a reciprocating linear/rotational motion conversion device and a cylinder device used in the mechanical transmission field.

DESCRIPTION OF THE RELATED ART

There are a plurality of mechanisms in the prior art for conversion between the reciprocating linear motion and the rotational motion, and the most widely used mechanism is the crank link mechanism used in an air compressor or an engine. However, the crank link mechanism has relatively low transmission efficiency. Take a piston engine for example, the efficiency of fuel utilization of the engine with the crank link mechanism is only about 30% without significant improvement for a long time.

In order to improve the efficiency of the piston engine, those skilled in the art have persistently improved and optimized the transmission device of the piston engine. For example, patent No. CN105114179A discloses a shaft type connecting rod transmission system and an opposed piston engine. The transmission system comprises a main shaft and at least one linear reciprocating motion unit. The linear reciprocating motion unit comprises at least one linear reciprocating motion body. One end of a corresponding shaft type connecting rod is fixedly connected with the linear reciprocating motion body, and the other end thereof is connected with a corresponding push-pull frame. A slide block is arranged in the push-pull frame. Two external walls of the slide block and two transverse internal walls of the push-pull frame are in a sliding fit. Internal teeth with reference circle in elliptical shape are arranged on an inner ring of the slide block. The internal teeth are circularly engaged with a gear correspondingly arranged on the main shaft. A reversing mechanism is arranged between the main shaft and a reversing block. While the shaft type connecting rod transmission system is capable of converting the linear reciprocating motion into rotational motion, the reciprocation of the slide block in operation increases load and mechanical friction of the system and vibrates the system. The shaft type connecting rod transmission system has a low efficiency, produces great noise and works unstably, and the mechanism is easy to be stuck and stopped and has low dependability.

For another example, inventive patent CN1399063A discloses a sector-gear engine, the engine adopts a sector-gear mechanism to convert a piston reciprocating motion into a sector gear rotation, and the sector gear is engaged with a gear rack pair in positive direction and disengaged from the gear rack pair in negative direction. However, in the technical solution, the gear rack pair is unconstrained after disengagement from the sector gear. The piston continuously drives the gear rack pair integrated with a piston rod, and the sector gear cannot be reengaged with the gear rack pair accurately. Thus the transmission cannot be smooth and stable.

Therefore, there is no reciprocating linear/rotational motion conversion device in the prior art that can significantly improve transmission efficiency, reduce energy consumption and support smooth and continuous operation.

SUMMARY OF THE INVENTION

A technical problem to be solved by the invention is to provide a reciprocating linear/rotational motion conversion device capable of significantly improving transmission efficiency, reducing energy consumption and supporting smooth and continuous operation.

In order to solve the technical problem, the invention provides a reciprocating linear/rotational motion conversion device comprising a main shaft, a linear motion guiding mechanism, a sector gear and a rack frame linearly moving along the linear motion guiding mechanism. The sector gear is fixedly connected with the main shaft. A gear rack pair is arranged on the inner wall of the rack frame. The gear rack pair comprises a first gear rack and a second gear rack separately arranged on both sides of the sector gear. The reciprocating linear/rotational motion conversion device further comprises a reversing mechanism fixedly connected with the main shaft. A guiding curved surface and a guide member are arranged on the reversing mechanism. A reversing block is arranged on the rack frame. A first curved surface and a second curved surface are arranged on the reversing block. When the reciprocating linear/rotational motion conversion device is in a transmission state, the sector gear is engaged with the gear rack pair. When the reciprocating linear/rotational motion conversion device is in a transitional state, the sector gear is engaged with the gear rack pair, the first curved surface of the reversing block is constrained by an external surface of the guide member, and the second curved surface of the reversing block is constrained by the guiding curved surface. When the reciprocating linear/rotational motion conversion device is in a reversing state, the sector gear is disengaged from the gear rack pair, and the first curved surface of the reversing block is constrained by the external surface of the guide member, and the second curved surface of the reversing block is constrained by the guiding curved surface.

Further, the guide member comprises a guide shaft fixedly connected with the reversing mechanism and a roller wheel sleeved on the guide shaft.

Further, a rolling bearing is arranged between the roller wheel and the guide shaft.

Further, the first gear rack and the second gear rack of the gear rack pair are external gear rack, and the axis of the sector gear and the axis of the main shaft are misaligned.

Further, the linear motion guiding mechanism is a guide rail, and a roller is arranged between the guide rail and the rack frame.

Further, two reversing blocks are arranged on a left end external surface and a right end external surface of the rack frame, respectively, with the two reversing blocks being symmetrical with respect to a horizontal transverse central axis of the rack frame.

Further, there is only one reversing mechanism, and the reversing block is arranged on a single side.

Further, the first curved surface is composed of a transitional curved surface and a reversing curved surface, and the reversing curved surface is a circular arc curved surface, with a circular center at a central line of the main shaft during a reversing process.

Another technical problem to be solved by the invention is to provide a cylinder device capable of significantly improving transmission efficiency, reducing energy consumption and supporting smooth and continuous operation.

In order to solve the technical problem, the invention provides a cylinder device comprising the reciprocating linear/rotational motion conversion device, connecting rods, pistons and cylinder bodies. The cylinder body is sleeved on the piston. One end of the connecting rod is connected with a piston, and the other end thereof is connected with the rack frame. A cylinder head is arranged on one end of the cylinder body. A head cover is arranged on the reciprocating linear/rotational motion conversion device. The other end of the cylinder body is connected with the head cover.

Further, the connecting rods, the pistons, the cylinder heads, the head covers and the cylinder bodies are arranged on both sides of the rack frame in pairs.

The advantages of the invention are as follows: the reciprocating linear/rotational motion conversion device of the application enables accurate constraint on the rack frame by the reversing mechanism in the transitional phase and reversing phase through the reversing mechanism synchronously rotating with the main shaft and the reversing block arranged on the rack frame. Therefore, the rack frame moves along the predetermined trail, and the sector gear is synchronously disengaged from a gear rack of the gear rack pair and engaged with the other gear rack of the gear rack pair smoothly, stable and uninterrupted way. The sector gear is accurately reengaged with the gear rack pair. Therefore, the overall process of converting the reciprocating linear motion to the rotational motion is completed continuously and accurately with low impact, smooth reversion and low mechanical consumption of the device in operation.

Figure 1:
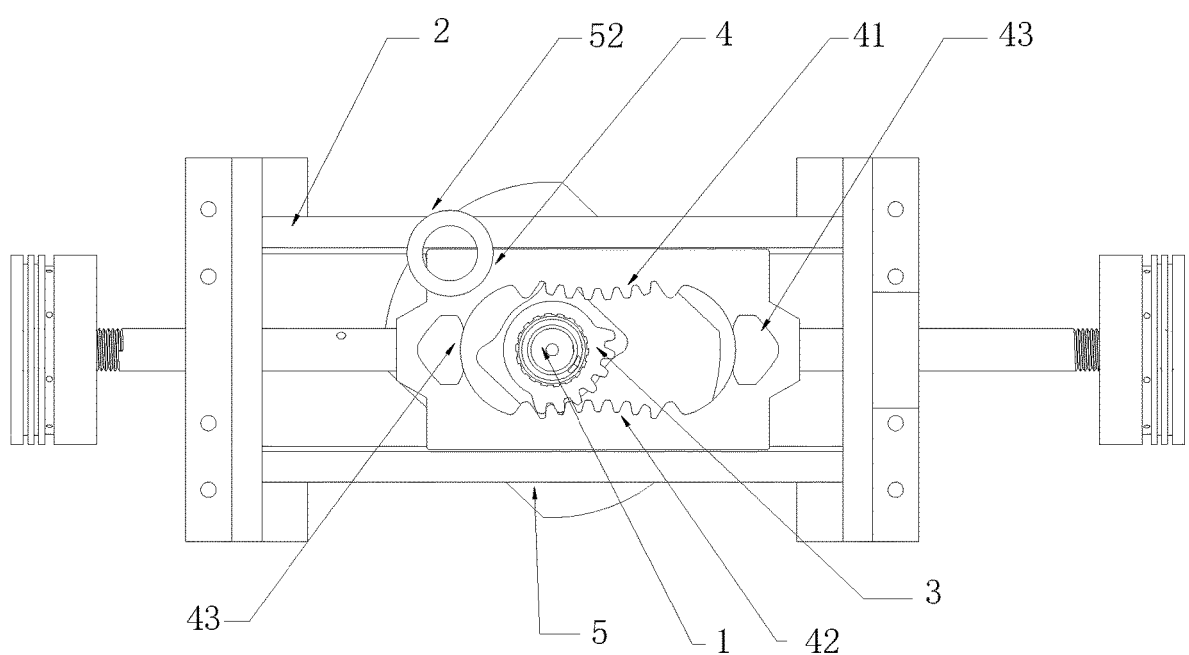
FIG. 1 is a front view of the device in transmission phase.

Components, parts and marks in the figures: main shaft 1, linear motion guiding mechanism 2, sector gear 3, rack frame 4, first gear rack 41, second gear rack 42, reversing block 43, first curved surface 431, transitional curved surface 4311, reversing curved surface 4312, second curved surface 432, reversing mechanism 5, guiding curved surface 51, roller wheel 511, guide shaft 512, guide member 52, connecting rod 6, piston 7, cylinder body 8, cylinder head 9, and head cover 10.

DESCRIPTION OF THE PREFERRED EMBODIMENTS

The invention will be further described in combination with drawings.

Figure 2:
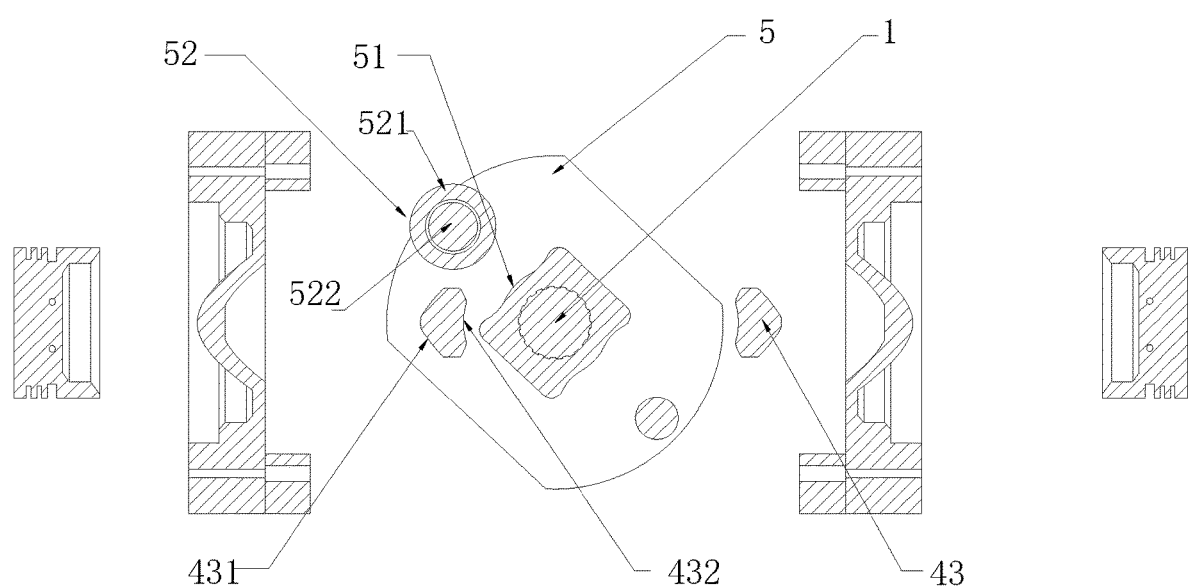
FIG. 2 is a sectional view of the device in transmission phase.
Figure 3:
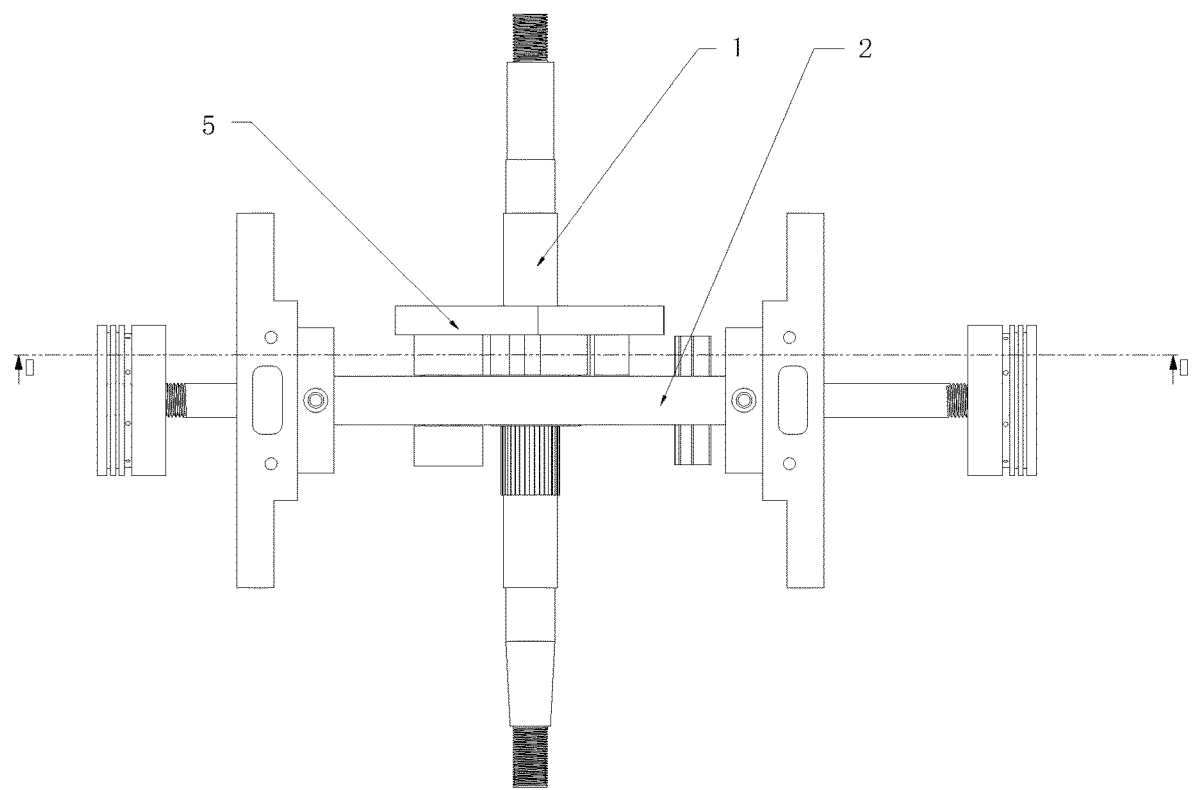
FIG. 3 is a top view of the device in transmission phase.

In order to solve the technical problem, the invention provides a reciprocating linear/rotational motion conversion device comprising a main shaft 1, a linear motion guiding mechanism 2, a sector gear 3 and a rack frame 4 linearly moving along the linear motion guiding mechanism 2. The sector gear 3 is fixedly connected with the main shaft 1. A gear rack pair is arranged on the inner wall of the rack frame 4. The gear rack pair comprises a first gear rack 41 and a second gear rack 42 separately arranged on both sides of the sector gear 3. The reciprocating linear/rotational motion conversion device further comprises a reversing mechanism 5 fixedly connected with the main shaft 1. A guiding curved surface 51 and a guide member 52 are arranged on the reversing mechanism 5. A reversing block 43 is arranged on the rack frame 4. A first curved surface 431 and a second curved surface 432 are arranged on the reversing block 43. The movement relationship among the components is described as follows: when the reciprocating linear/rotational motion conversion device is in a transmission state, the sector gear 3 is engaged with the gear rack pair; when the reciprocating linear/rotational motion conversion device is in a transitional state, the sector gear 3 is engaged with the gear rack pair, the first curved surface 431 of the reversing block 43 is constrained by an external surface of the guide member 52, and the second curved surface 432 of the reversing block 43 is constrained by the guiding curved surface 51; and when the reciprocating linear/rotational motion conversion device is in a reversing state, the sector gear 3 is disengaged from the gear rack pair, the first curved surface 431 of the reversing block 43 is constrained by the external surface of the guide member 52, and the second curved surface 432 of the reversing block 43 is constrained by the guiding curved surface 51. The reciprocating linear/rotational motion conversion device of the invention can realize interconversion between reciprocating linear motion of the rack frame 4 and continuous rotating motion of the main shaft 1. The operation consists of three phases:

1. A transmission phase: As shown in FIG. 1, FIG. 2 and FIG. 3, the sector gear 3 is engaged with the gear rack pair in the phase, the gear rack pair linearly moves with the rack frame 4, and the sector gear 3 rotates with the main shaft 1 synchronously. By the engagement with the sector gear 3, the gear rack pair realizes the interconversion between the reciprocating linear motion of the rack frame and the rotational motion of the main shaft 1.

Figure 4:
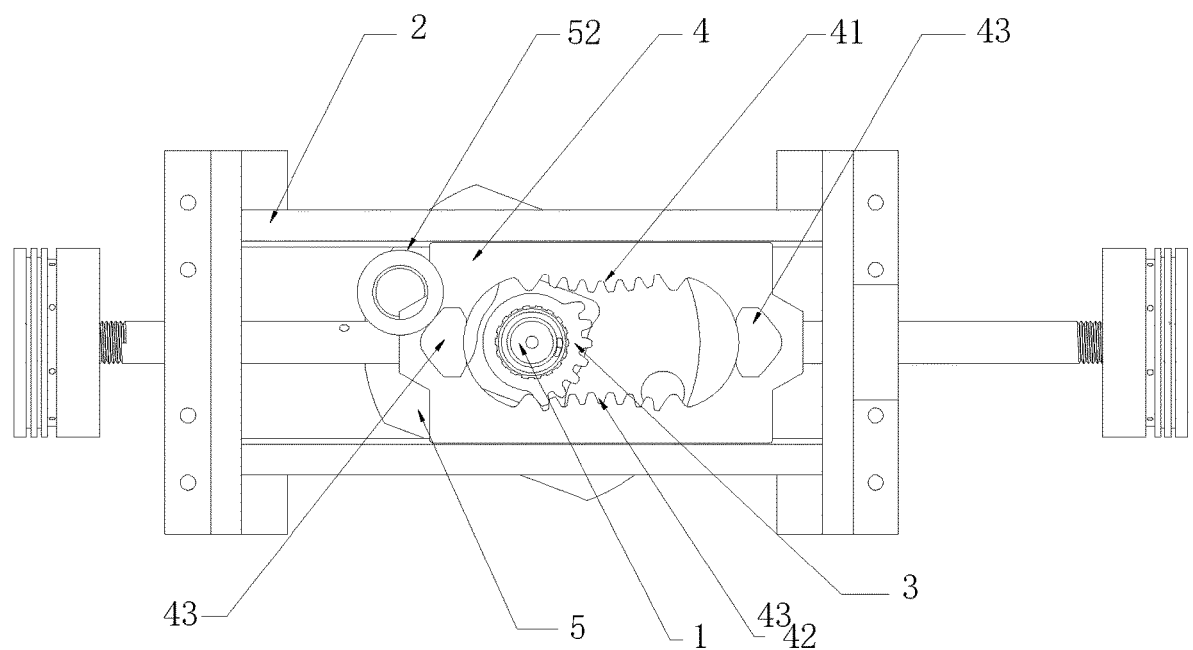
FIG. 4 is a front view of the device in transitional phase.
Figure 5:
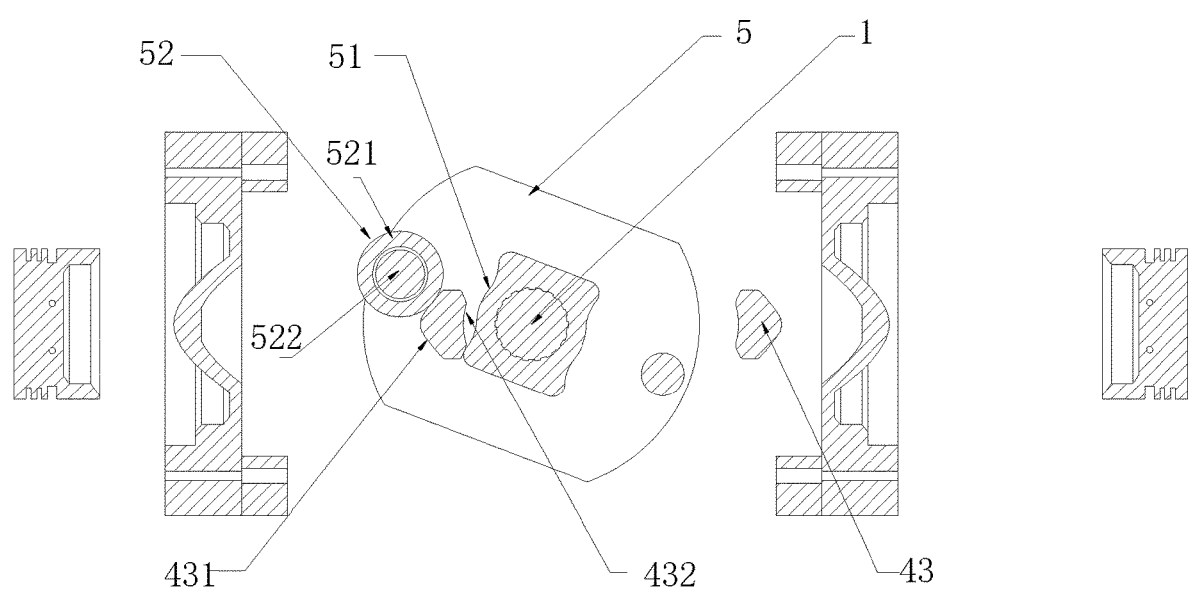
FIG. 5 is a sectional view of the device in transitional phase.
Figure 6:
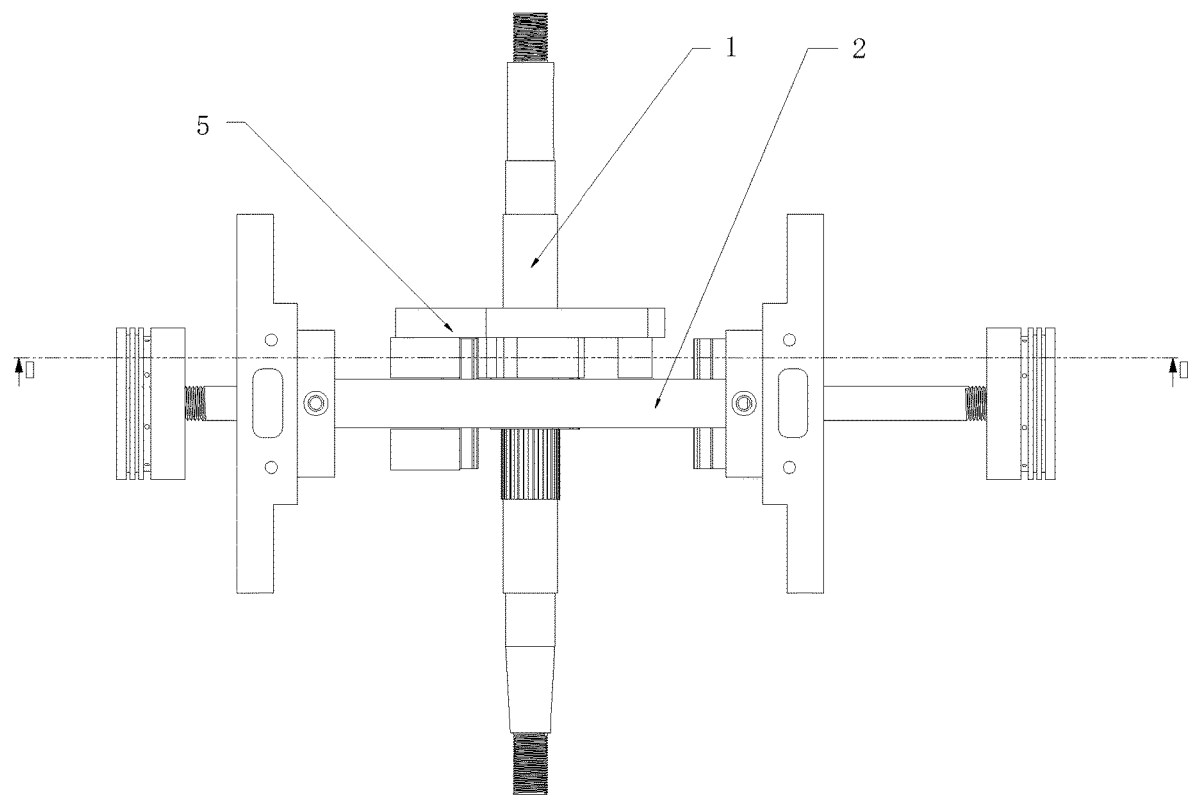
FIG. 6 is a top view of the device in transitional phase.

2. A transitional phase: As shown in FIG. 4, FIG. 5 and FIG. 6, the sector gear 3 is engaged with the end of the gear rack pair in the phase, and the reversing mechanism 5 is driven by the main shaft 1 to rotate to a position where the guide member 52 and the guiding curved surface 51 constrain the reversing block 43 on the rack frame 4. Meanwhile, the reversing block 43 is confined between the guide member 52 and the guiding curved surface 51 and incapable of free translation.

Figure 7:
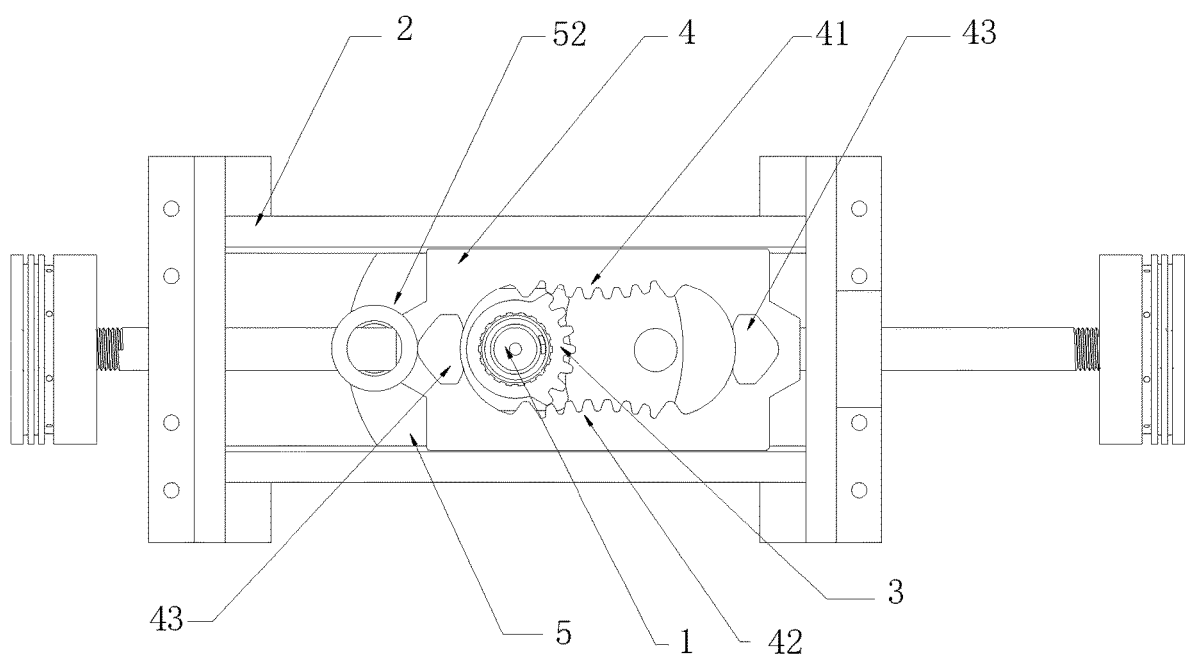
FIG. 7 is a front view of the device in reversing phase.
Figure 8:
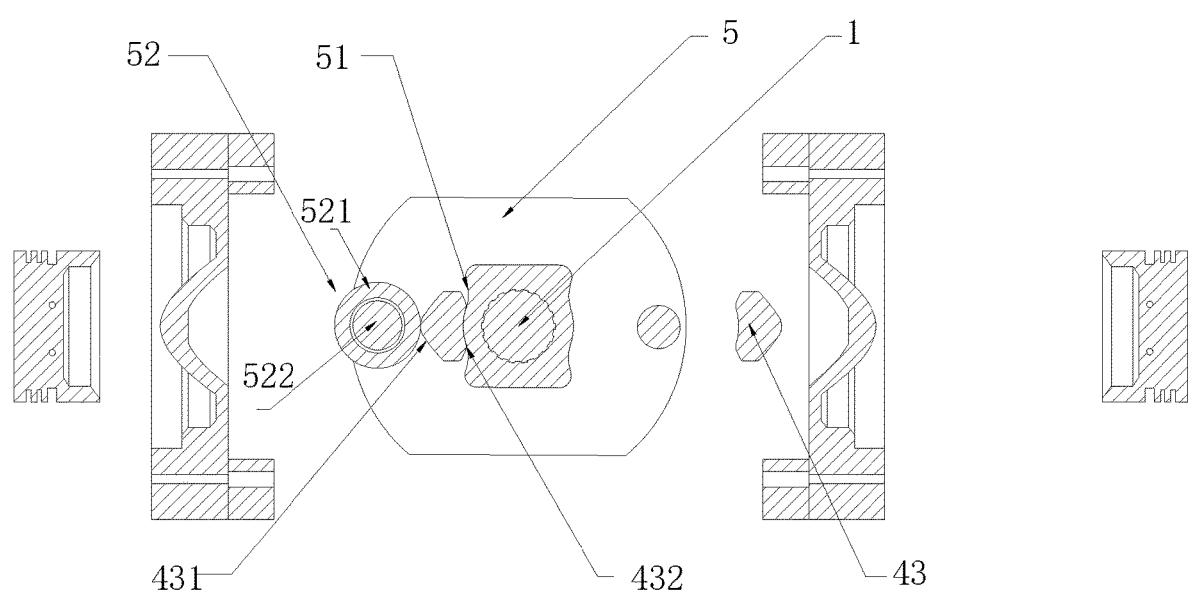
FIG. 8 is a sectional view of the device in reversing phase.
Figure 9:
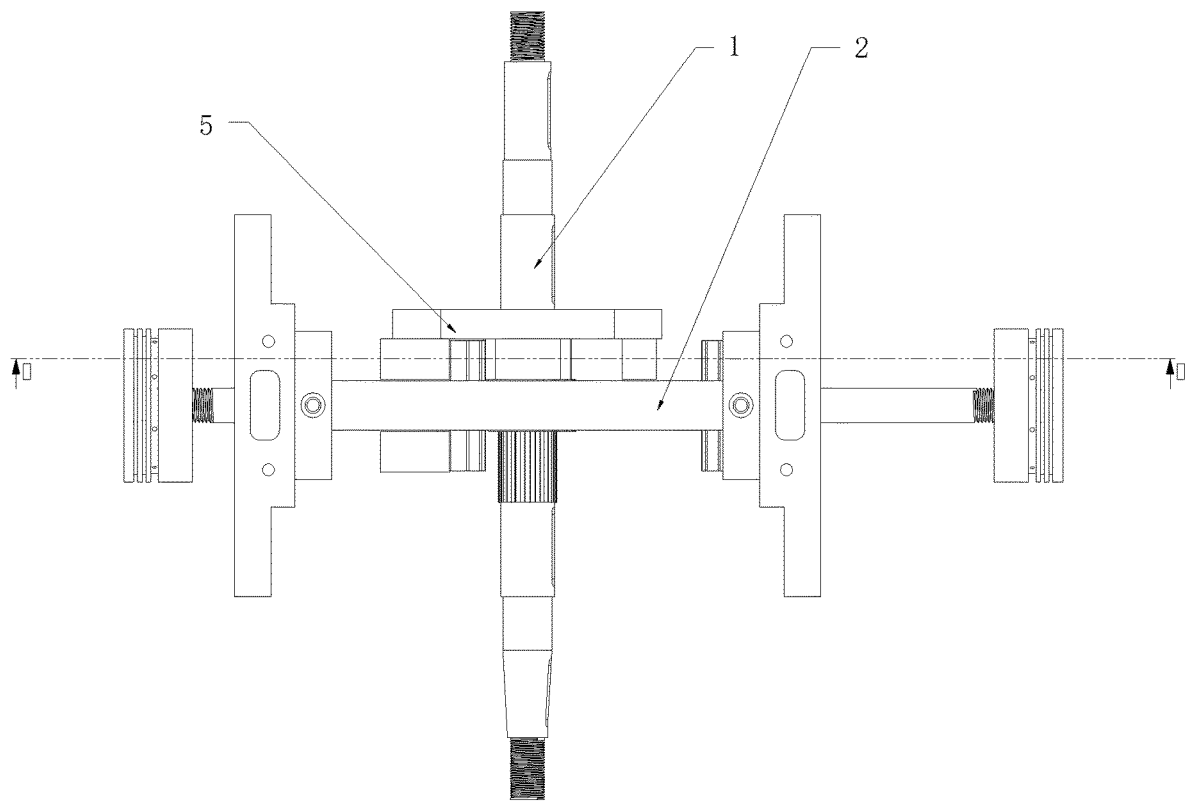
FIG. 9 is a top view of the device in reversing phase.

3. A reversing phase: As shown in FIG. 7, FIG. 8 and FIG. 9, the sector gear 3 is completely disengaged from the gear rack pair in the phase, the guide member 52 and the guiding curved surface 51 are still in the position of constraining the reversing block 43. Meanwhile, the reversing block 43 is confined between the guide member 52 and the guiding curved surface 51 and incapable of free translation.

In the transitional phase and the reversing phase, the guide member 52 and the guiding curved surface 51 constrain the reversing block 43 on the rack frame 4, i.e., the reversing block 43 only moves within an area formed between the guide member 52 and the guiding curved surface 51.

By the end of the reversing phase, the device reenters the transitional phase, and the sector gear 3 starts to be engaged with the end of a gear rack of the gear rack pair on the other side. With the continuous operation of the device, the sector gear 3 is completely engaged with the gear rack pair, and then the device starts to enter the transmission phase. The device enters the three phases in a successive manner for continuous operation.

In the reversing phase, the gear rack pair is completely disengaged from the sector gear 3, and the rack frame 4 has a trend to continuously move without the constraint of the sector gear 3. If the rack frame 4 continues to move, the sector gear 3 is incapable of being properly engaged with the gear rack pair in the next phase, resulting in an operation failure of the device. The reversing mechanism 5 of the application rotates with the main shaft 1 synchronously. When the sector gear 3 rotates to the reversing phase, the reversing mechanism 5 also rotates to the reversing position. Meanwhile, the first curved surface 431 of the reversing block 43 gets in contact with the external surface of the guide member 52, thus the external surface of the guide member 52 constrains one side of the reversing block 43; and the second curved surface 432 of the reversing block 43 gets in contact with the guiding curved surface 51, thus the guiding curved surface 51 constrains the other side of the reversing block 43. With the constraining of the guide member 52 and the guiding curved surface 51, the guide block fixedly connected with the rack frame 4 keeps the rack frame 4 stationary after the rack frame 4 is constrained, unless the sector gear 3 rotates and reengages with the gear rack pair to enter the transitional phase.

In the transitional phase, the gear rack pair is only partially engaged with the sector gear 3, and a single tooth of the gear bears relatively heavy load. Thus, in the application, by the reversing mechanism 5 rotating with the main shaft 1 synchronously, the sector gear 3 rotates to the transactional phase and the first curved surface 431 of the reversing block 43 gets in contact with the external surface of the guide member 52, while the second curved surface 432 of the reversing block 43 gets in contact with the guiding curved surface 51, and the curved surface of the reversing mechanism 5 guides the reversing block 43. The reversing block 43 moves horizontally and linearly along a predetermined trail under the interaction and constraint between the reversing mechanism 5 and the reversing block 43. The load applied to the sector gear 3 and the gear rack pair during the transitional phase is further distributed to the external surface of the guide member 52 of the reversing mechanism 5 and the curved surfaces of the reversing block 43, so that the device runs smoothly during the transition process without sticking or stopping. The linear motion guiding mechanism 2 of the application plays a guiding role to ensure that the rack frame 4 accurately moves linearly manner under the constraint of the linear motion guiding mechanism 2.

The guide member 52 comprises a guide shaft 512 fixedly connected with the reversing mechanism 5 and a roller wheel 511 sleeved on the guide shaft 512. The roller wheel 511 of the guide member 52 is enabled to rotate freely in relative to the reversing mechanism 5. The friction is reduced as the reversing block 43 gets in contact with the guide member 52 in the manner of rolling friction.

A rolling bearing is arranged between the roller wheel 511 and the guide shaft 512 to minimize the friction.

The gear rack pair is a pair of external gear rack, and an axis of the sector gear 3 and an axis of the main shaft 1 are misaligned to adapt to the reliable engagement between the sector gear and the gear rack pair. The axis of the sector gear refers to the axis of the gear corresponding to the sector gear. The gear rack on the rack frame 4 is of the linear gear rack or the external gear rack, the axis of the sector gear 3 matched with the gear rack is also coaxial or non-coaxial to the axis of the main shaft 1. Preferably, the external gear rack is used to match with the offset-axis sector gear 3. Compared with the linear gear rack, the external gear rack has the following advantages: decreasing the gear cutting degree of the gear rack engaged with the sector gear 3 in the transitional phase; improving the engagement between the sector gear 3 and the gear rack to evenly distribute the load thereon, in particular to the load on the last tooth; increasing wear resistance of the sector gear 3 and the gear rack; and realizing a smooth transitional process to avoid impact noise generated therein.

The linear motion guiding mechanism 2 is a guide rail, and a roller is arranged between the guide rail and the rack frame 4. The guide rail limiting structure is simple and compact and has a capability of accurate limitation. A roller is additionally positioned to reduce the friction between the rack frame 4 and the guide rail. In addition, a limit roller wheel 511 and other limitation manners are optional.

Two reversing block 43 are arranged on a left end external surface and a right end external surface of the rack frame 4, respectively, with the two reversing blocks being symmetrical with respect to a horizontal transverse central axis of the rack frame 4. With the solution, the stability of the structure is improved through a symmetrical arrangement to enable a stable operation process of the device.

Figure 12:
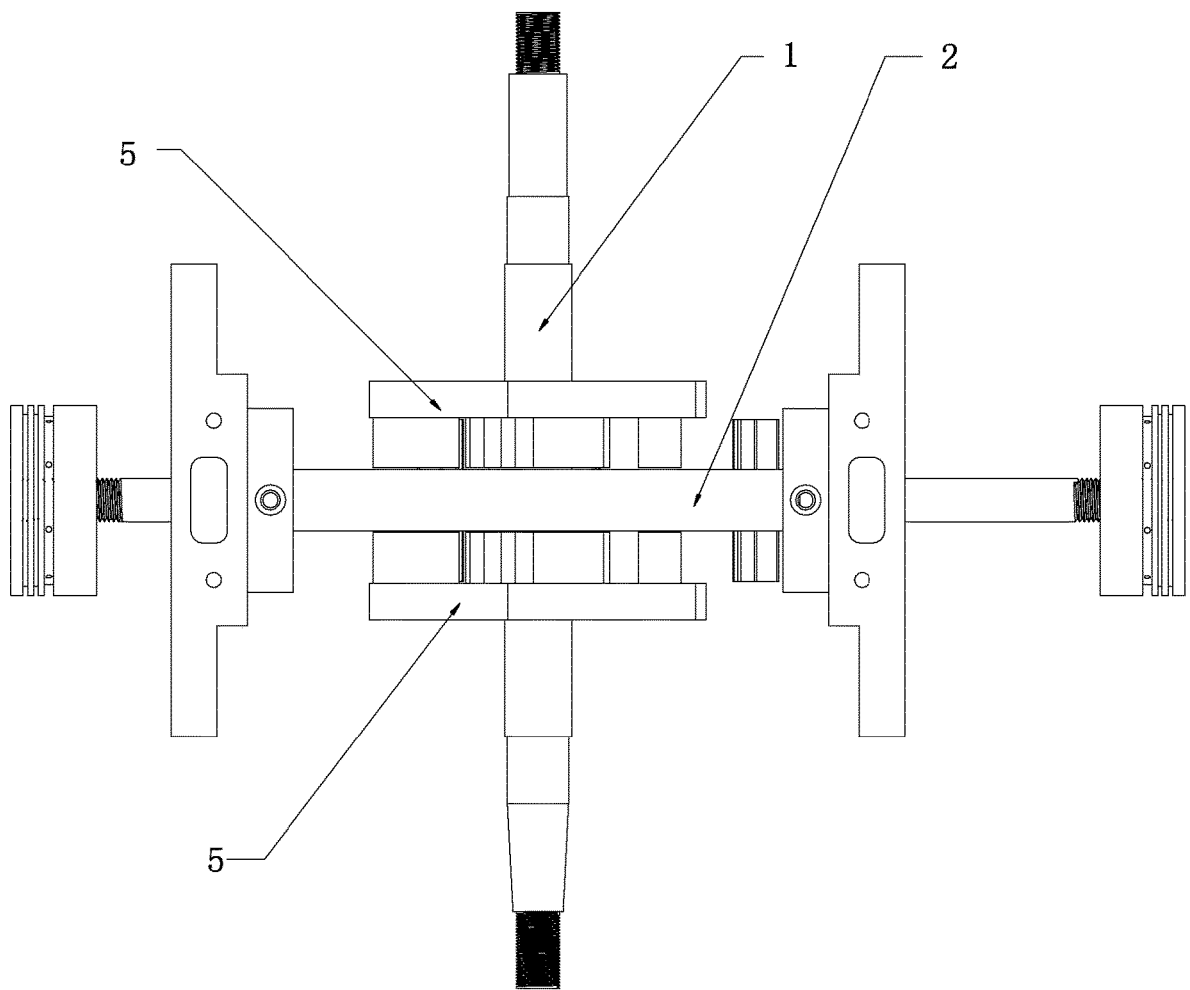
FIG. 12 is a structural diagram of the symmetrically arranged reversing mechanism.
Figure 13:
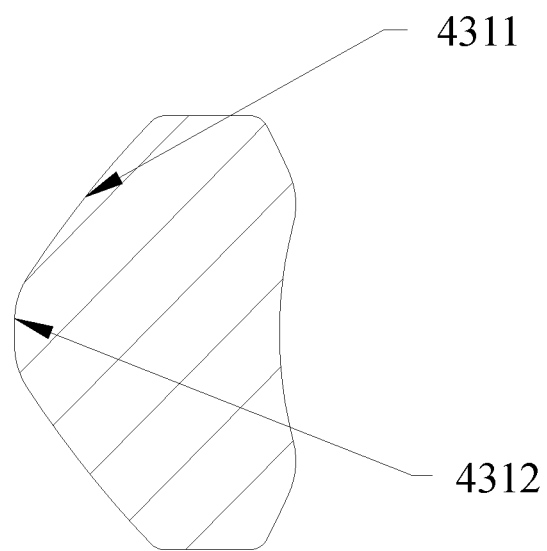
FIG. 13 is a structural diagram of the reversing block.

As shown in FIG. 12, the reversing mechanism of the application can be symmetrically arranged.

As one of the structural forms, the reversing mechanism 5 of the device can be a single one, and the corresponding reversing block 43 is arranged on a single side correspondingly.

The first curved surface 431 is composed of a transitional curved surface 4311 and a reversing curved surface 4312, and the reversing curved surface 4312 is a circular arc curved surface, with a circular center at a central line of the main shaft 1 during a reversing process. During the transition process, the reversing block 43 is constrained by the transitional curved surface 4311, enabling the rack frame 4 to smoothly convert from the transition process to the reversing process during the movement. In the reversing process, the reversing block 43 is constrained by the reversing curved surface 4312. As the reversing curved surface 4312 is a circular arc curved surface with the corresponding circular center at the central line of the main shaft 1, the rack frame 4 remains a position during the reversing process until the end of the reversing process and the restart of the transitional phase. The processes can be connected seamlessly by using the method to run the device continuously and smoothly.

Figure 10:
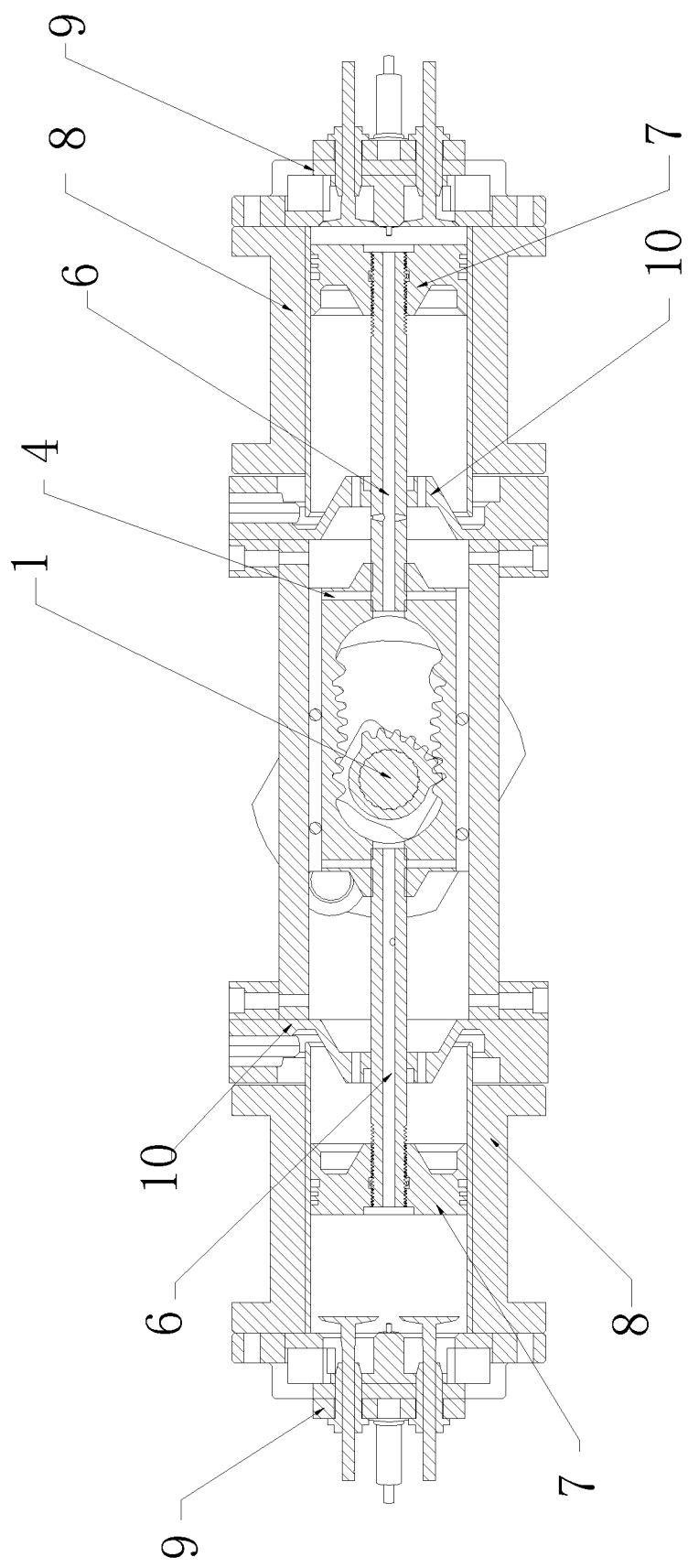
FIG. 10 is a structural diagram of the device in an opposed double-cylinder four-stroke piston engine.

As shown in FIG. 10, the cylinder device of the invention comprises the reciprocating linear/rotational motion conversion device, connecting rods 6, pistons 7 and cylinder bodies 8. The cylinder body 8 is sleeved on the piston 7. One end of the connecting rod 6 is connected with the piston 7, and the other end thereof is connected with the rack frame 4. A cylinder head 9 is arranged on one end of the cylinder body 8. A head cover 10 is arranged on the reciprocating linear/rotational motion conversion device. The other end of the cylinder body 8 is connected with the head cover 10. The cylinder device of the application is formed by the piston, the cylinder and other main components on the basis of the reciprocating linear/rotational motion conversion device.

The reciprocating linear/rotational motion conversion device has the characteristics of high transmission efficiency, low energy consumption and stable and continuous operation. Therefore, replacing the crank link 6 mechanism in the prior art with the reciprocating linear/rotational motion conversion device of the application for transmission significantly improves the efficiency of the cylinder device and reduces abrasion of the cylinder body 8 caused by the piston 7 in the prior art. In the embodiment, only a connecting rod 6 is additionally arranged between the piston 7 and the rack frame 4, the linear motion of the piston 7 is able to transmit to the rack frame 4 through the connecting rod 6, and then the reciprocating linear motion of the rack frame 4 is converted into the continuous rotational motion of the main shaft 1 for output through the device. In addition, with the cylinder device of the application, compared with the prior art, the cavities on both sides of the piston 7 can be effectively used, In addition, the side forces applied to the rack frame 4 and the piston 7 of the device of the application are fully borne by the guide rail, thus avoiding the abrasion of the side walls of the cylinder body 8 caused by the piston 7 in the prior art. As the core transmission means of an engine or a compressor is the reciprocating linear/rotational motion conversion device, the cylinder device of the application can be designed as the engine or the compressor by those of ordinary skill in the art according to specific requirements.

The cylinder device of the application can be assembled on various forms of engines and compressors, including but not limited to: As one of preferred embodiments, in the cylinder device of the application, the connecting rods 6, the pistons 7, the cylinder heads 9, the head covers 10 and the cylinder bodies 8 are arranged on both sides of the rack frame 4 in pairs to act as a double-piston engine or double-piston compressor.

The reciprocating linear/rotational motion conversion device consists of a plurality of devices. These reciprocating linear/rotational motion conversion devices output power through a power shaft or receive power input through a power shaft.

As the core transmission means of an engine or a compressor is the reciprocating linear/rotational motion conversion device, the cylinder device of the application can be designed as the engine or the compressor by those of ordinary skill in the art according to specific requirements.

The rational combination is available according to these forms.

Some embodiments of the application as shown as follows:

In Example 1, as shown in FIG. 10, an opposed double-cylinder four-stroke piston engine comprises a reciprocating linear/rotational motion conversion device, connecting rods 6, pistons 7 and cylinder bodies 8. One end of the connecting rod 6 is connected with the piston 7, and the other end thereof is connected with the rack frame 4. A cylinder head 9 is arranged on one end of the cylinder body 8. A head cover 10 is arranged on the reciprocating linear/rotational motion conversion device; and the other end of the cylinder body 8 is connected with the head cover 10. The piston 7 is positioned in the cylinder and capable of reciprocating in the cylinder. The piston 7 separates the cylinder into a front variable cavity and a rear variable cavity. The cavity corresponding to the front surface of the piston 7 is referred to as a front cavity. As shown in FIG. 10, the front cavity recurrently performs a four-stroke cycle orderly consisting of a compression stroke, a power stroke, an exhaust stroke and an air suction stroke through control of an air inlet and an air outlet configured on the cylinder head 9 by the reciprocating motion of the piston 7 in combination with an air distribution system.

Figure 11:
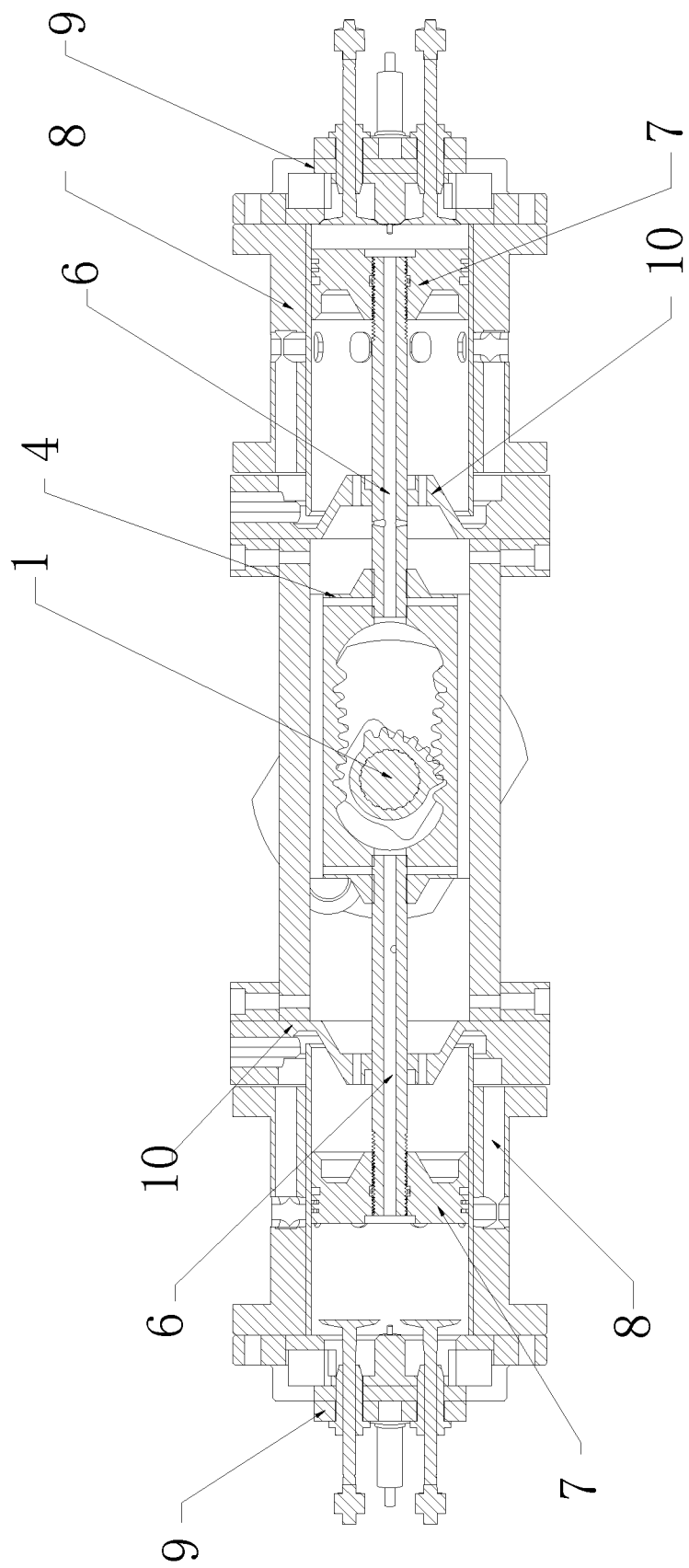
FIG. 11 is a structural diagram of the device in an opposed double-cylinder double two-stroke piston engine.

In Example 2, as shown in FIG. 11, an opposed double-cylinder double two-stroke piston engine comprises a reciprocating linear/rotational motion conversion device, connecting rods 6, pistons 7 and cylinder bodies 8. One end of the connecting rod 6 is connected with the piston 7, and the other end thereof is connected with the rack frame 4. A cylinder head 9 is arranged on one end of the cylinder body 8. A head cover 10 is arranged on the reciprocating linear/rotational motion conversion device; and the other end of the cylinder body 8 is connected with the head cover 10. The piston 7 is positioned in the cylinder and capable of reciprocating in the cylinder. The piston 7 separates the cylinder into a front variable cavity and a rear variable cavity. The cavity corresponding to the front surface of the piston 7 is referred to as a front cavity, and the cavity corresponding to the rear surface of the piston 7 is referred to as a rear cavity. As shown in FIG. 11, through the reciprocating motion of the piston 7, an air inlet on the cylinder body 8 is controlled by a piston skirt, and an air outlet on the cylinder head 9 is controlled by an air distribution system to enable the front cavity to perform a compression stroke, a power stroke, a scavenge stroke, a two-stroke cycle, air suction stroke of the rear cavity and compression cycle, and feed compressed air to the front cavity in the scavenging process through an air passage of the cylinder body and the air inlet on the cylinder body.

In Example 3, a single-cylinder four-stroke piston engine of the example is formed by removing the cylinder, the cylinder head 9, the piston 7 and the connecting rod 6 on one side of the opposed double-cylinder four-stroke piston engine of Example 1.

In Example 4, a single-cylinder two-stroke piston engine of the example is formed by removing the cylinder, the cylinder head 9, the piston 7 and the connecting rod 6 on one side of the opposed double-cylinder double two-stroke piston engine of Example 2.

Figure 14:
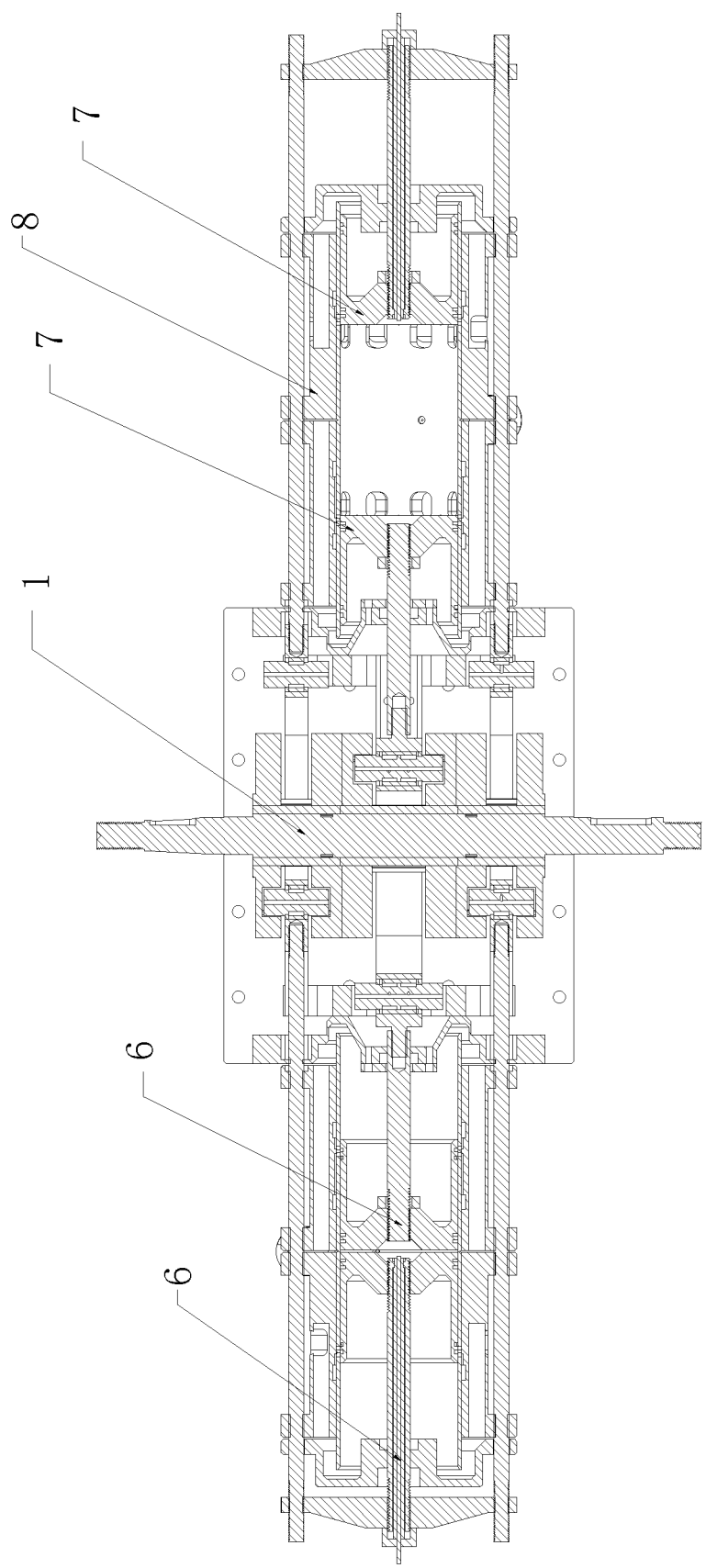
FIG. 14 is a structural top view of the device in an opposed piston opposed cylinder (OPOC) two-stroke engine.

In Example 5, as shown in FIG. 14, three reciprocating linear/rotational motion conversion devices are used, two connecting rods 6 and two pistons 7 are arranged in a piston cylinder on opposite sides respectively to form an opposed piston opposed cylinder two-stroke engine (also known as OPOC engine).

The invention claimed is:

1. A reciprocating linear/rotational motion conversion device, comprising:
    a main shaft,
    a linear motion guiding mechanism,
    a sector gear fixedly connected with the main shaft,
    a rack frame configured to move along the linear motion guiding mechanism,
    a gear rack pair arranged on the inner wall of the rack frame,
    a reversing mechanism fixedly connected with the main shaft,
    a guiding curved surface and a guide member are arranged on the reversing mechanism, wherein the guide member comprises a guide shaft fixedly connected with the reversing mechanism and a roller wheel sleeved on the guide shaft, and
    a reversing block arranged on the rack frame,
    wherein, when reciprocating linear motion and rotational motion mutually convert, the reversing block is jointly constrained by the guide member and the guiding curved surface.

2. The reciprocating linear/rotational motion conversion device of claim 1, wherein, when the reciprocating linear/rotational motion conversion device is in a transmission state, the sector gear is engaged with the gear rack pair; when the reciprocating linear/rotational motion conversion device is in a transitional state, the sector gear is engaged with the gear rack pair, and the reversing block is constrained by the guide member and the guiding curved surface; and when the reciprocating linear/rotational motion conversion device is in a reversing state, the sector gear is disengaged from the gear rack pair, and the reversing block is constrained by the guide member and the guiding curved surface.

3. The reciprocating linear/rotational motion conversion device of claim 2, wherein the reversing block has a first curved surface and a second curved surface, when the reciprocating linear/rotational motion conversion device is in a transitional state, the sector gear is engaged with the gear rack pair, the first curved surface of the reversing block is constrained by an external surface of the guide member, and the second curved surface of the reversing block is constrained by the guiding curved surface; and when the reciprocating linear/rotational motion conversion device is in a reversing state, the sector gear is disengaged from the gear rack pair, the first curved surface of the reversing block is constrained by the external surface of the guide member, and the second curved surface of the reversing block is constrained by the guiding curved surface.

4. The reciprocating linear/rotational motion conversion device of claim 1, wherein the linear motion guiding mechanism is a guide rail, and a roller is arranged between the guide rail and the rack frame.

5. The reciprocating linear/rotational motion conversion device of claim 1, wherein two reversing blocks are respectively arranged on a left end external surface and a right end external surface of the rack frame, with the two reversing blocks being symmetrical with respect to a horizontal transverse central axis of the rack frame.

6. The reciprocating linear/rotational motion conversion device of claim 1, comprising only one reversing mechanism, and the reversing block is arranged on a single side of the rack frame.

7. The reciprocating linear/rotational motion conversion device of claim 1, wherein a rolling bearing is arranged between the roller wheel and the guide shaft.

8. A cylinder device, comprising: the reciprocating linear/rotational motion conversion device of claim 1, a plurality of connecting rods, a plurality of pistons, and a plurality of cylinder bodies, wherein each cylinder body is sleeved on one of the plurality of pistons, a first end of each connecting rod is connected with one of the plurality of pistons, and a second end of each connecting rod is connected with the rack frame, each cylinder body has a first end connected to a cylinder head and a second end connected to a head cover, wherein the head cover is arranged on the reciprocating linear/rotational motion conversion device.

9. The cylinder device of claim 8, wherein the plurality of cylinder bodies are arranged on two sides of the rack frame in pairs.

* * * * *